United States Patent [19]
Kolvereid

[11] Patent Number: 5,232,249
[45] Date of Patent: Aug. 3, 1993

[54] FASTENING DEVICE

[76] Inventor: Harald Kolvereid, Skellefteåvn. 22, N-8610, Grubhei, Norway

[21] Appl. No.: 652,384
[22] PCT Filed: May 26, 1988
[86] PCT No.: PCT/NO88/00045
 § 371 Date: Jan. 27, 1989
 § 102(e) Date: Jan. 27, 1989
[87] PCT Pub. No.: WO88/09444
 PCT Pub. Date: Dec. 1, 1988

Related U.S. Application Data

[63] Continuation of Ser. No. 305,732, Jan. 27, 1989, abandoned.

[30] Foreign Application Priority Data

| May 27, 1987 | [NO] | Norway | 872219 |
| Sep. 8, 1987 | [NO] | Norway | 873742 |
| Sep. 8, 1987 | [NO] | Norway | 873743 |
| Dec. 3, 1987 | [NO] | Norway | 875052 |

[51] Int. Cl.$^5$ .................................................. F16L 35/00
[52] U.S. Cl. .................................... 285/39; 285/421; 285/323; 403/367
[58] Field of Search ............ 285/322, 323, 216, 162, 285/394, 358, 421, 94, 382.7; 403/367, 368, 366, 374, 351

[56] References Cited

U.S. PATENT DOCUMENTS

| 611,556 | 9/1898 | Blanton | 403/367 X |
| 1,064,663 | 6/1913 | Maynard | 403/367 X |
| 1,257,852 | 2/1918 | Hall | 285/323 X |
| 1,277,982 | 9/1918 | Matte | 285/394 X |
| 1,606,188 | 11/1926 | Selah | 285/323 |
| 1,819,652 | 8/1931 | Metcalf | 285/323 |
| 1,886,413 | 11/1932 | Metcalf | 285/323 |
| 2,434,152 | 1/1948 | Forry | 287/119 |
| 2,461,680 | 2/1949 | Cousino | 81/90 |
| 2,462,493 | 2/1949 | Hamer | 285/94 X |
| 2,930,642 | 3/1960 | Howlett | 287/114 |
| 3,129,038 | 4/1964 | Benson | 308/236 |
| 3,245,704 | 4/1966 | Franck | 285/382.7 X |
| 4,109,945 | 8/1978 | Manchester | 285/323 |
| 4,407,603 | 10/1983 | Lundgren | 403/374 X |
| 4,702,635 | 10/1987 | Mullenberg | 403/374 |

FOREIGN PATENT DOCUMENTS

| 79416 | 10/1932 | Denmark . |
| 46622 | 12/1932 | Denmark . |
| 0210771 | 2/1987 | European Pat. Off. . |
| 850255 | 9/1952 | Fed. Rep. of Germany . |
| 2004659 | 8/1971 | Fed. Rep. of Germany ...... 403/368 |
| 2230670 | 1/1974 | Fed. Rep. of Germany . |
| 8026028 | 6/1982 | France . |
| 51592 | 10/1932 | Norway . |
| 443419 | 2/1986 | Sweden . |

Primary Examiner—Dave W. Arola
Attorney, Agent, or Firm—Staas & Halsey

[57] ABSTRACT

A fastening device in the shape of an outer clamping sleeve member with an internal thread, and an inner clamping sleeve member with an external thread, said clamping sleeve members being mutually rotatable. One or both of the clamping sleeve members may be provided with an axial through slot or may have mutually parallel, axially extending and partly overlapping slots. The threads of the clamping sleeve members may be a cylindrical or a conical shape. A central sleeve may be provided between the outer and inner clamping sleeve members for cooperation with same. Wrench mounts are provided on the device, such as teeth and slots, and a complementary securing tool may be inserted to engage the teeth and slots for mutual turning of the clamping sleeve members. The device can be used, e.g., to mount a shaft to a wheel-hub, to connect pipe ends, or as a non-threaded nut.

21 Claims, 10 Drawing Sheets

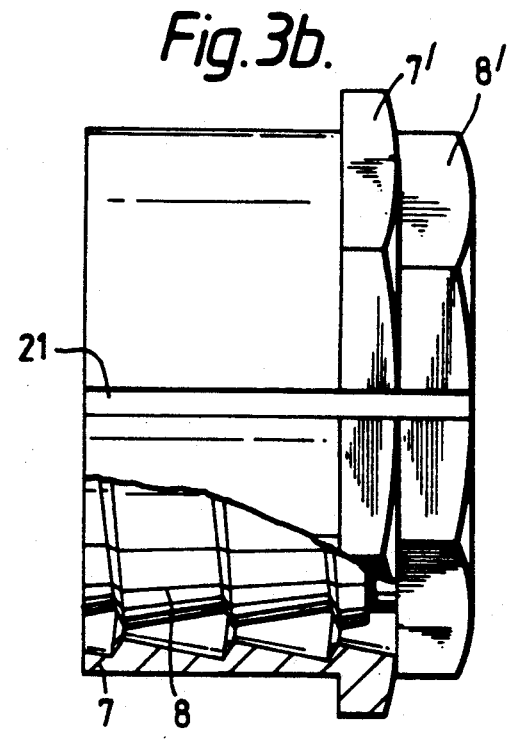
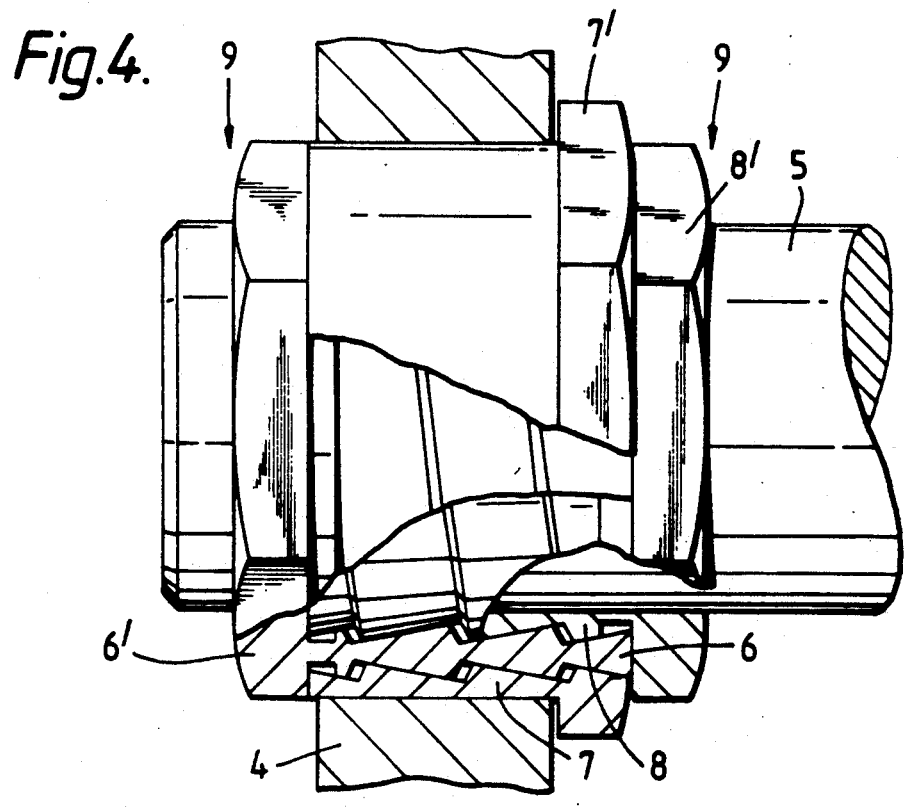

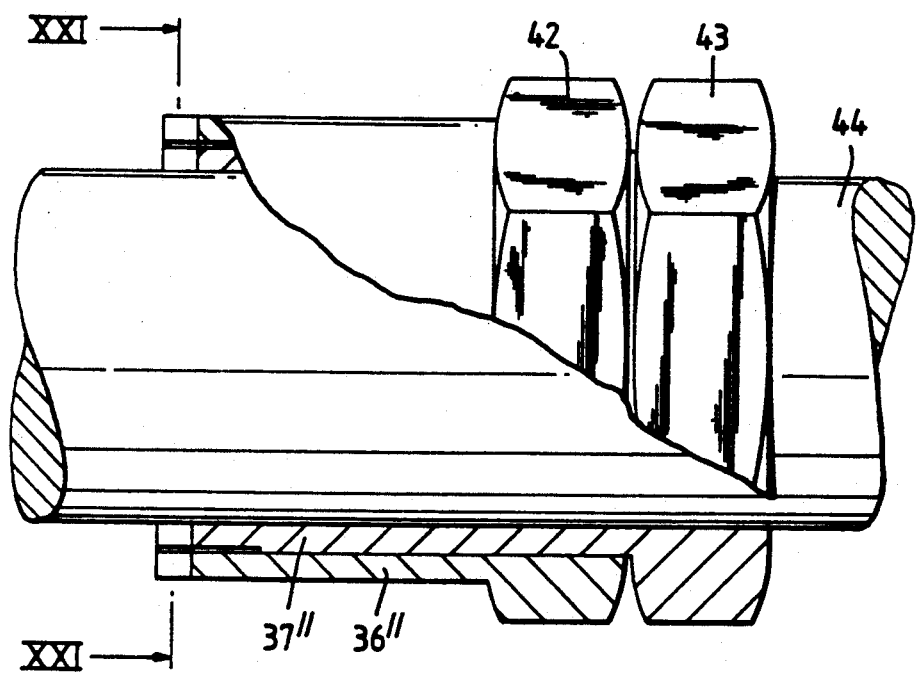
Fig.20.
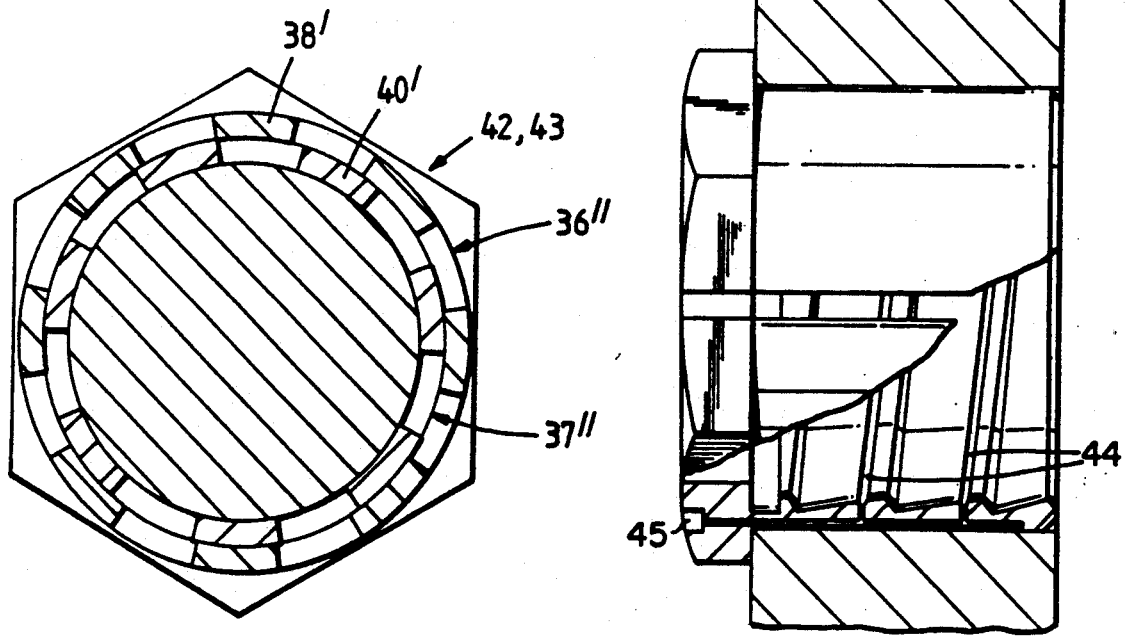
Fig.21.
Fig.22.

FASTENING DEVICE

This application is a continuation of application Ser. No. 07/305,732, filed Jan. 27, 1989, now abandoned.

BACKGROUND OF THE INVENTION

The present invention relates to a fastening or fixing device and a tool for securing the same.

Dependent on its utilization, a fixing device may in one a form include a clamping sleeve for fixing cog wheels, coupling halves, inner rings of roller bearings, and the like on shafts, for joining shafts or pipes, connecting pipes in T-joints, attaching a tool to a machine, etc., and may, in a second form include a nut for use on a non-threaded bolt.

The methods most well-known today for fixing wheels, coupling halves, and the like on shafts include use of keys, adapters, like "Taper Locks", and shrinking. The first mentioned method is labor consuming, and requires cutting wedge-shaped grooves in the shaft as well as in the wheel, whereas the second requires much space as well as being labor consuming, although it is a simple method in case of replacement or maintenance. The third method mentioned above, i.e. shrinking, is the method requiring least space. On the other hand, this method demands great accuracy in processing as well as special procedures, like heating/cooling in connection with mounting operations which are, thus, typically carried out in a workshop.

Screws and nuts are well-known fixing devices and are widely used in present technical equipment, but nuts and threads also have other uses than this conventional one, e.g. a nut may be used for locking a roller bearing on a shaft.

When the mentioned fixing devices are secured it is important to ensure clamping in a controlled and reliable manner. A clamping sleeve used as a structural member represents a novelty. Practical tests, however, have shown that the conventional hexagonal design of nuts provides an unsuitable wrench mount for sleeves, and the same is the case for hook wrenches. Such wrench mounts require too much axial space and/or too much thickness of sleeve material to be useful in practical cases.

It is, thus, desirable to develop new kinds of fixing devices which are especially useful for thin sleeves, like the clamping sleeve mentioned above, but also for the kind of nuts comprised by the present invention.

BRIEF DESCRIPTION OF THE DRAWINGS

FIG. 3a shows a variant of the embodiment of FIG. 1 with an outer and an inner locking sleeve member, FIG. 4 illustrates the clamping sleeve according to FIGS. 3a and 3b in an assembled state and surrounding a shaft.

FIG. 22 illustrates releasing means for heavy duty sleeves.

SUMMARY OF THE INVENTION

Figure 1A:
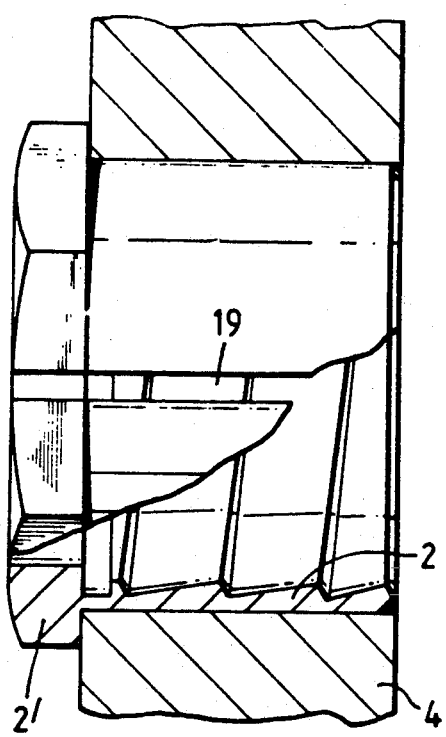
FIGS. 1a and 1b illustrate the components of a clamping sleeve comprising an outer and an inner sleeve member according to the present invention.

The clamping sleeve, inter alia, shown in FIGS. 1-5, will simplify operations when a wheel is mounted on a shaft, since it will suffice to turn the shaft and hole in the wheel hub roughly, requirements of tolerances are moderate, and rough turned surfaces provide a good hold, at the same time as mounting operations are very simple and may, thus, be carried out at the location where the equipment is, i.e. on the workshop floor or at the work site.

The sleeve with cylindrical threads is advantageous in relation to various concepts based on a cone, in that there is no relative axial movement between sleeve, shaft and wheel during tightening operations.

It should also be mentioned that the sleeve requires very little space radially as well as axially. If desired, a simple approach may be chosen with the handles of securing tools projecting only on one side of the wheel hub or bearing.

In use, a single-acting sleeve has a unique function. If it is correctly mounted it will cause the wheel, coupling, or whatever is mounted on the shaft to spin free when the shaft is subjected to a shock load in one sense of rotation. A shock load in the other direction will cause the wheel to spin more firmly onto the shaft or the shaft to break. If the wheel is mounted on two clamping sleeves having a width of half the hub, with one sleeve mounted on each side, shock loads will cause increased tightening of the sleeve on one or the other side, independent of the sense of rotation, alternatively to shaft fracture.

When a central clamping sleeve is used with an outer and an inner locking sleeve, it will be possible, when the design is correct, to make the wheel spin free in case of a shock load, independent of the sense of rotation.

Above examples of the performance of the coupling illustrate the special characteristics of the device. If the device is used on other rotating machine elements, e.g. couplings, outer and inner rings for roller/ball bearings, etc., unique advantages are achieved in these areas as well, as compared to conventional methods.

Connecting pipes or mounting pipes to various adapter members now often requires expensive and time consuming working of the pipe ends by providing threads and/or soldering/welding. For connecting high pressure pipes, fittings are used which are labor consuming in production due to the number of members in each joint as well as exacting demands on precision.

When the clamping sleeve principle is used on pipe fittings as indicated in FIGS. 5 and 6, and FIGS. 7 and 8, implementation involves few members, and at the same time, processing is simple in manufacture of the members because of moderate demands on tolerances. Work in connection with mounting pipes, especially hydraulic equipment, is considerably simplified by use of clamping sleeves, since use of special tools and preparation of pipe ends is rendered unnecessary.

A clamping sleeve may be repeatedly used on used or new pipes, and with the same good result.

DETAILED DESCRIPTION OF THE PREFERRED EMBODIMENTS

Figure 1B:
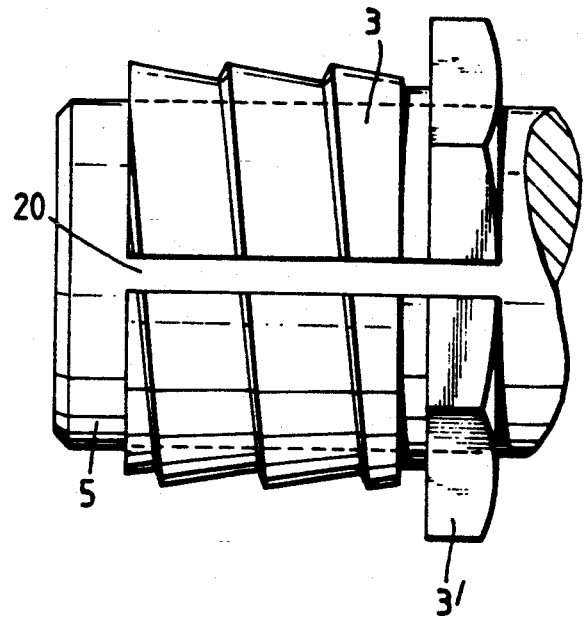
Figure 2:
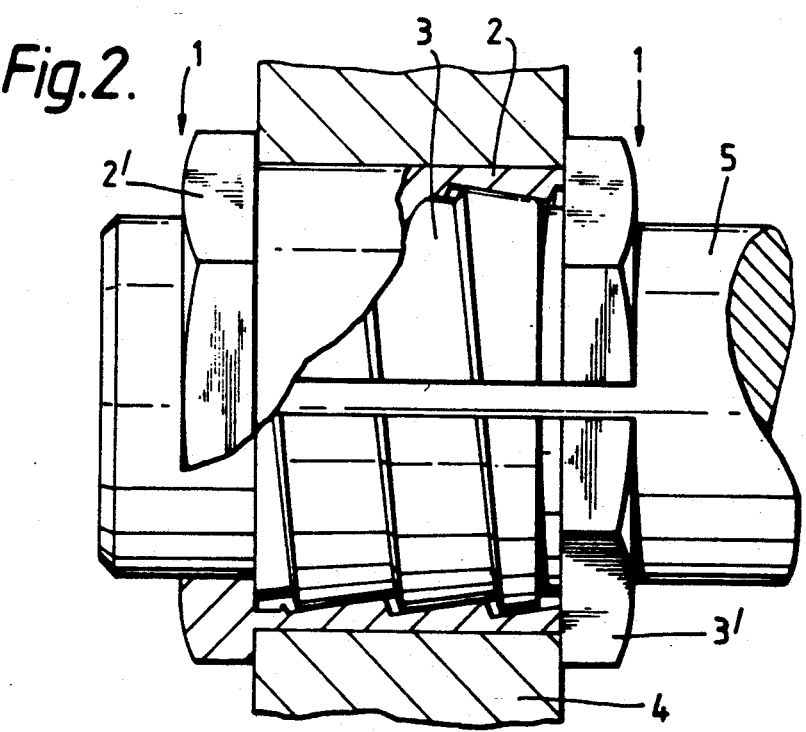
FIG. 2 shows the outer sleeve and inner sleeve members according to FIG. 1 in a coupled state and surrounding a shaft.

As shown in FIGS. 1 and 2, a first embodiment of the clamping unit 1 comprises an outer sleeve 2 and an inner sleeve 3. Each sleeve has a special thread, the outer sleeve having an internal thread and the inner sleeve an external thread, the shapes of which ensure that when the sleeves 2,3 are pushed/screwed together to stop, and tightening is continued, instead of a high axial and a low radial component force, as in the case of standard threads, the opposite is achieved here, i.e. a high radial and a low axial component. The thread is normally cylindrical, as shown in FIGS. 1–6, but it may be conical (cf. FIGS. 7–11), inter alia to compensate for tolerance during tightening, or to seal off the thread in an axial direction.

FIG. 1a shows outer sleeve 2 provided in a wheel-hub 4, and FIG. 1b shows inner sleeve 3 provided on a shaft 5. In FIG. 2 clamping sleeve 1 is illustrated with wheel-hub 4 clamped onto said axle 5. In FIG. 2 the wrench mounts on sleeves 2 and 3, respectively, are indicated by 2' and 3', respectively. The play between the thread flanks not exposed to pressure during tightening will appear from FIG. 2. Also, it will appear from FIGS. 1a and 1b, as well as FIG. 2, that the profile of threads has a saw-tooth like shape with the pitch of a tooth being less steep than its fall, e.g. as seen in FIG. 1b with reference to the uppermost profile.

Operations are as follows when coupling a wheel to a shaft 5 Outer or locking sleeve 2 is mounted in the wheel hub 4 and inner or locking sleeve 3 is pushed/screwed into sleeve 2 to stop. Shaft 5 is now inserted into sleeve 3 and wheel 4 is positioned as desired. Mounting operations are continued by screwing sleeve 3 into sleeve 2, outer sleeve 2 expanding until butting against hub 4, and inner sleeve 3 shrinking to hold the shaft 5. Mutual pressure will arise to lock the wheel onto the shafts.

As will appear from, inter alia, FIGS. 3 and 4, the sleeves may be designed so as to have both wrench mounts 7',8' projecting on the same side of wheel-hub 4. As will appear best from FIG. 4 and from FIGS. 3a and 3b showing the details, a central clamping sleeve 6 is used which has a wrench mount 6'. Central clamping sleeve 6 is engaged with an outer and an inner locking sleeve 7, and 8, respectively. Said cooperating sleeves will cause the wheel to spin free of the shaft dependent of the sense of rotation in case of a shock load.

In FIG. 4 reference numeral 9 indicates the complete clamping device.

Figure 5A:
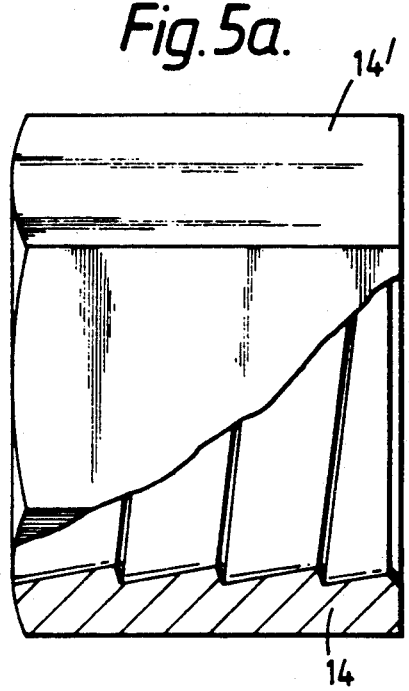
FIGS. 5a and 5b illustrate the components of a connecting coupling.

It will appear from FIGS. 3 and 4 that the thread profile is approximately corresponding to that of FIGS. 1 and 2. This is the case as regards the embodiment shown in FIGS. 5 and 6 as well. However, FIGS. 5 and 6 relate to a clamping sleeve 10 for connecting two pipe ends 11, 12. Pipe ends 11 and 12 are shown to be inserted in an inner sleeve 13 provided with a wrench mount 13'. In FIG. 5a an outer or clamping sleeve 14 has a wrench mount 14' looking rather like a nut. As compared with the solid design of clamping sleeve 14, locking sleeve 13 is thin and solid. Pipe ends 11, 12 are inserted in sleeve 13 which is provided with gasket rings or beads 15 abutting against the pipes. If sleeve 14 is pushed/screwed onto sleeve 13 and tightened in relation to the latter and the pipes, sleeve 13 will be firmly clamped onto pies 11, 12 and gasket rings or beads 15 will slightly deform pipes 11,12 providing further mutual attachment. This kind of coupling is, thus, also suitable for high pressure connections.

In case of clamping sleeves on pipes of a comparatively soft material, e.g. plastic or copper, clamping sleeve 13 may be thin-walled and of the same quality grade of material as the pipes, whereas clamping sleeve 14 is made thick-walled or, alternatively, of a stronger material. Connections of this kind will be suitable for pipes subjected to low pressures, e.g. water pipes, and the like.

Figure 7A:
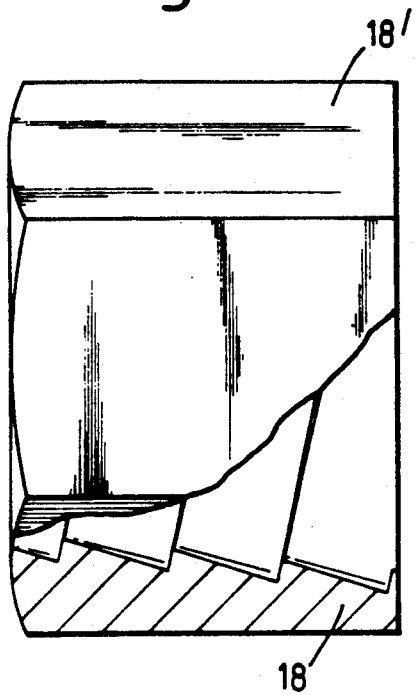
FIGS. 7a and 7b show a variant of the embodiments shown in FIGS. 5a, and 5b, respectively.
Figure 7B:
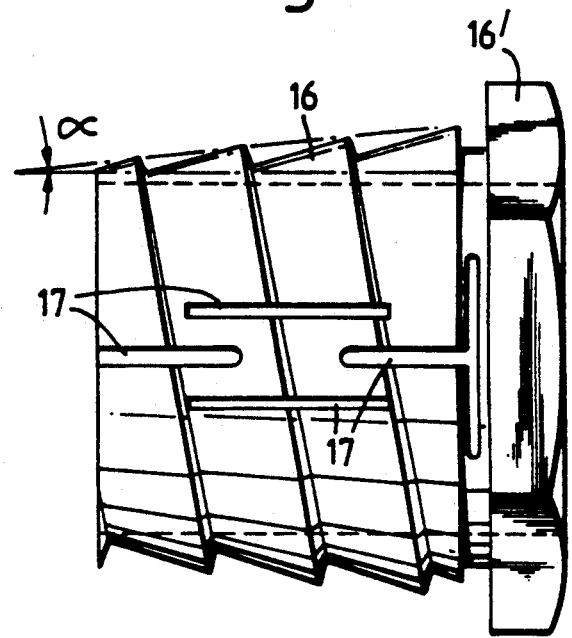
Figure 8:
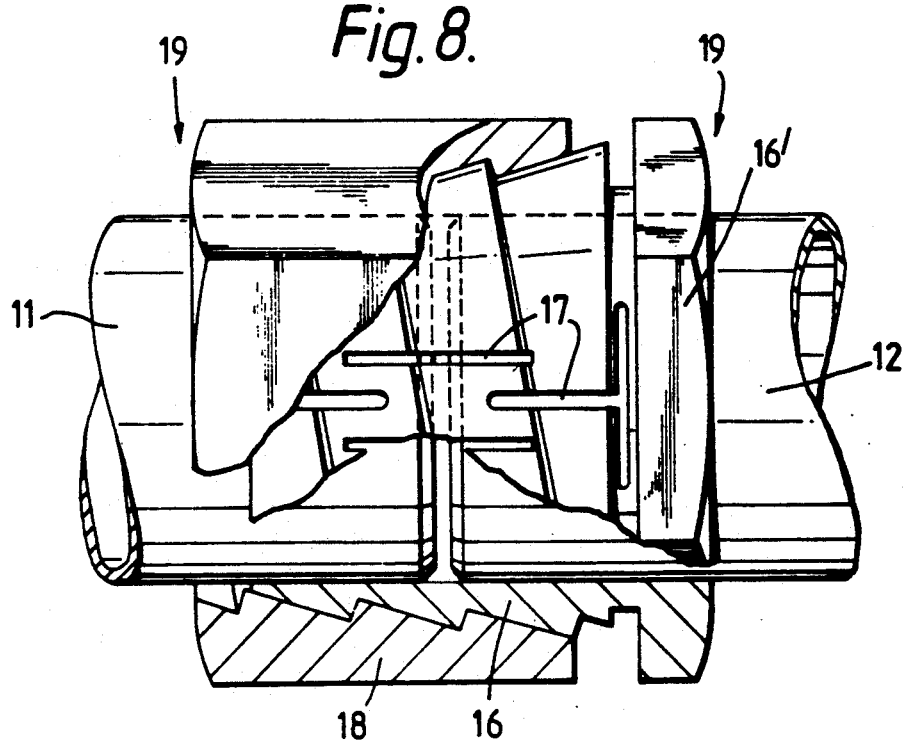
FIG. 8 shows the connecting coupling of FIG. 7 in an assembled state surrounding two pipe ends, FIGS. 9a and 9b shown an outer sleeve, and an inner sleeve, respectively, for a nut for use on a bolt without threads.

FIGS. 7 and 8 show a conical inner or locking sleeve 16 with a wrench mount 16', and with a plurality of rows of parallel, and overlapping slots 17, and a corresponding clamping sleeve 18 having a wrench mount 18'. It will appear that the threads are reversed as compared to the threads of sleeve 14 in FIG. 5a, and that the threads are conical, corresponding to locking sleeve 16 in FIG. 7a. In FIG. 8 the complete clamping sleeve is shown generally designated 19 and tightened on the conical thread to a stop, tightening being achieved between pipe ends 11, 12.

Figure 5B:
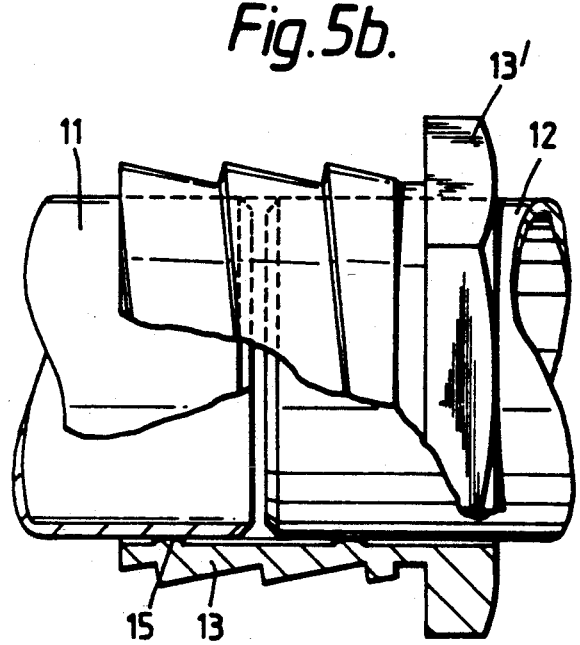
Figure 6:
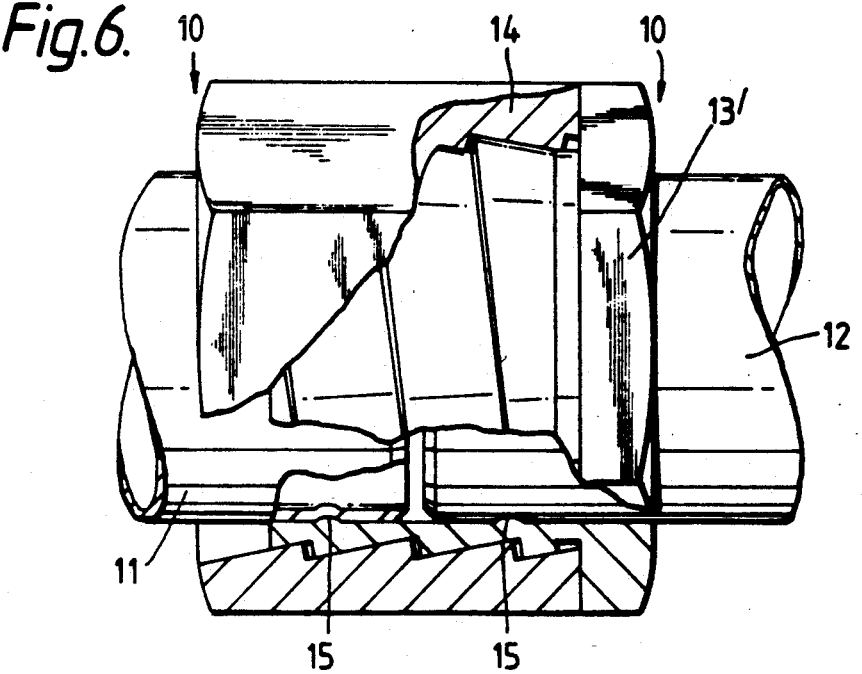
FIG. 6 shows the connecting coupling in an assembled state surrounding two pipe ends.

As mentioned, the thread, in this case, has a reversed shape as compared with the cylindrical version shown in FIG. 5. The purpose of this design is to permit the nut to be pushed onto the double cone formed by the cone and flank angle of the thread to provide for a tight fit.

If a shape like that of the cylindrical thread is selected, the cone in the thread may be used to receive tolerances, whereas the flank angle provides clamping forces.

Conical threads of fittings, for high pressure pipes, is more labor consuming than the cylindrical design mentioned above, since the manufacture of conical threads is more complicated, in addition to milling of slots, by milling.

A connection is achieved by inserting pipe ends 11 and 12 to the center of locking sleeve 16 and in this position clamping sleeve 18 (which is already placed around pipe 11) is screwed to stop onto the conical locking sleeve. Then clamping sleeve 18 is tightened further against locking sleeve 16 a connection is achieved which is tight and resists great mechanical loads in the form of vibrations and pipe knocking.

In connection with the embodiments shown in FIGS. 1, 2, 3b, and 7,8 it should be mentioned that outer sleeve 2 in FIG. 1a and inner sleeve 3 of FIG. 1b have longitudinal slots 19, and 20, respectively, intended to render the sleeves more readily expandable in a radial direction. Consequently, the tolerances of the sleeves are not so critical as compared to requirements if there were a tight fit originally between the wheel hub 4 or shaft 5.

A corresponding concept is to be found in FIG. 3b where both outer sleeve 7 and inner sleeve 8 are provided with an axial slot, generally designated 21. However, it will obviously be useless to provide intermediate sleeve 6 with such slots.

In the embodiment shown in FIG. 5 there is no axial slot due to the fact that a relatively thin-walled inner sleeve is used with sealant beads or rings 15, and because a longitudinal slot would, in fact, prevent a liquid sealing.

In the embodiment shown in FIG. 7b liquid sealing is achieved even though axial and substantially radial slots are used, there being no open connection between various slots. This will contribute to prevent any liquid communication between the slots. At the same time, when an inner sleeve 16 of comparatively thick material is used, radial deformation will still be possible to provide a clamping effect against pipe ends 11 and 12.

Figure 9A:
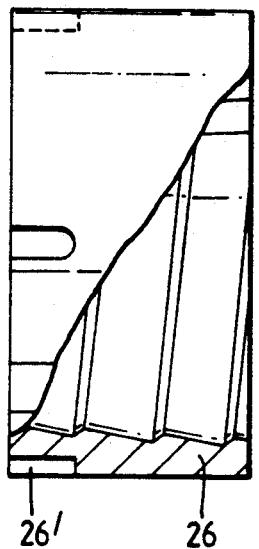
Figure 9B:
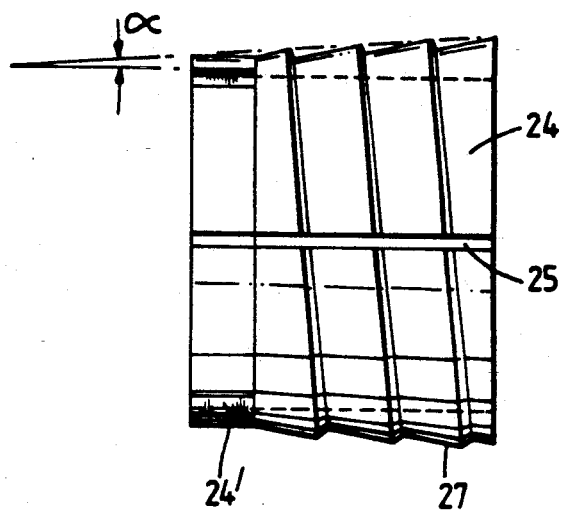

FIGS. 9a and 9b represent a variant of the concepts illustrated in the above described Figures. This embodiment is especially intended for use as a nut on a bolt without threads.

Figure 10:
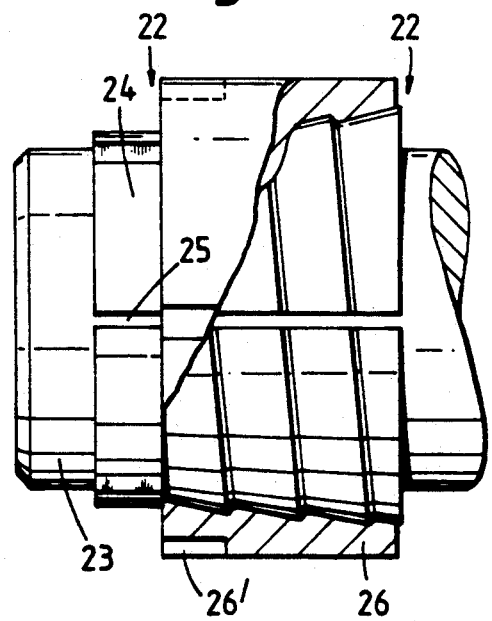
FIGS. 10 and 11 show the outer portion of the nut engaged with its inner portion before, and after tightening, respectively.

In FIG. 10 the thread-less nut has reference numeral 22. Nut 22 according to the invention is pushed onto a thread-less bolt 23 against an abutment and is then tightened. By tightening, clamping force against the bolt 23 is achieved simultaneously with thrust force on the abutment.

The nut comprises a thin-walled inner sleeve 24, cf. FIG. 9b, which may be solid or may have a longitudinal slot 25, and which has specially designed conical threads on most of its periphery as well as a wrench mount 24', and a thick-walled outer sleeve 26 having internal threads which correspond to the treads of the above mentioned member 24 and having a wrench mount 26' on its periphery.

Reference numeral 27 indicates the thread showing a conicity of 2α. In FIG. 10 the outer sleeve 26 of nut 22 is shown in engagement with inner sleeve 24 for tightening, and in FIG. 11 said members are shown after tightening, whereas ΔX marks the outer overhang of the outer sleeve 26 as compared to inner sleeve 24.

Figure 11:
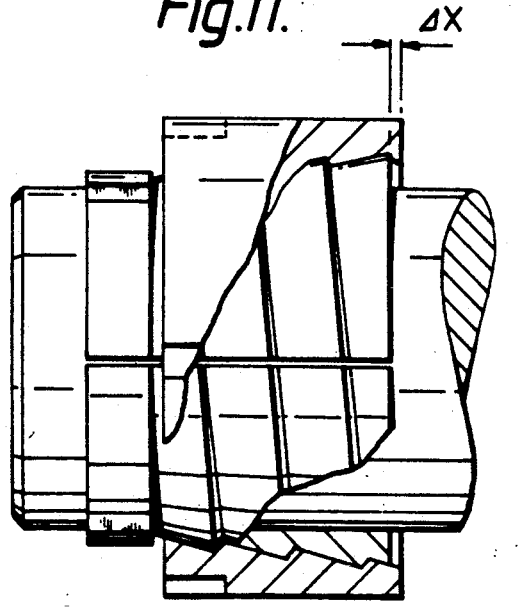

The nut 22 shown in FIGS. 9, 10, and 11 will commonly be made of steel, but may obviously be produced of other materials, e.g. brass or plastic, dependent on its utilization and the forces involved.

When the outer sleeve 26 is tightened in relation to inner sleeve 24 the thread cone will cause a clamping force against the bolt 23. In FIG. 10 it is shown how the outer sleeve 26 of the nut is set up against the inner sleeve 24, and if the outer sleeve 26 is further rotated in the same manner relative to the inner sleeve, the last mentioned will, due to the thread-cone and the slot 25 in the inner sleeve 24, be firmly clamped to bolt 23. Additional tightening will, thus, cause outer sleeve 26 to overhang ΔX outside the inner sleeve 24, as will appear from FIG. 11. The mentioned effect may, thus, be utilized at the same time to provide a hold on the bolt 23 and pushing force against a stop as indicated by the small arrows in FIG. 11.

As mentioned above, the conventional design of clamping nuts provided certain drawbacks as regards fixing. A remedy for this circumstance is indicated in FIG. 12, where it is intended to be able to rotate a sleeve by the aid of a new wrench mount with the second sleeve forming a counter mount, thus, to achieve great tightening moments by simple aids.

Figure 12A:
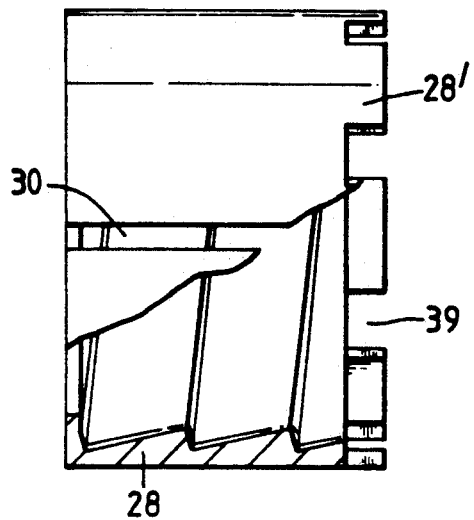
FIGS. 12a, 12b illustrate a clamping sleeve with a wrench mount, illustrating a variant of the embodiment of FIG. 1.

According to the invention the wrench mount is achieved by the aid of an outer sleeve 28 and an inner sleeve 29 in the shown embodiment, as shown in FIG. 12a, and 13b, respectively. Each sleeve is provided with a slot 31,31, respectively, and grip teeth 38' and 29', respectively. Outer sleeve 28 and inner sleeve 29 may have an equal or different number of teeth 28',29', the number of teeth, inter alia, depending on the difference of sleeve diameter. If outer sleeve 28 and inner sleeve 29 have a different number of teeth/slots, one sleeve may be rotated relative to the other by the aid of a securing tool, e.g. a lever 32, as clearly seen in FIGS. 15 and 16. Alternatively, if tightening moments become large, it is possible to use spanners 33 and 34 for the outer, and inner sleeve, respectively (to avoid fracturing of the teeth). Such spanners will be adapted to the sots and teeth of the respective sleeves and may, e.g. extend over approximately half of the circumference of the sleeves, as indicated in FIG. 17.

Figure 12B:
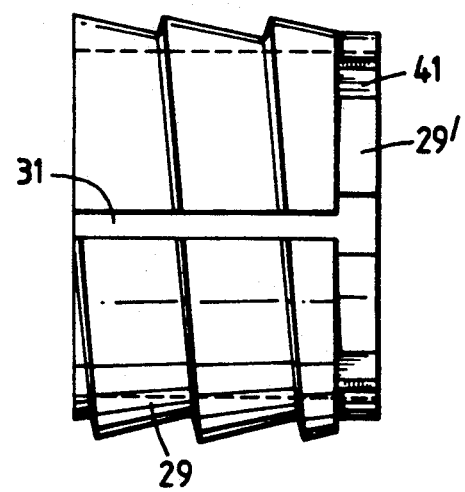
Figure 13:
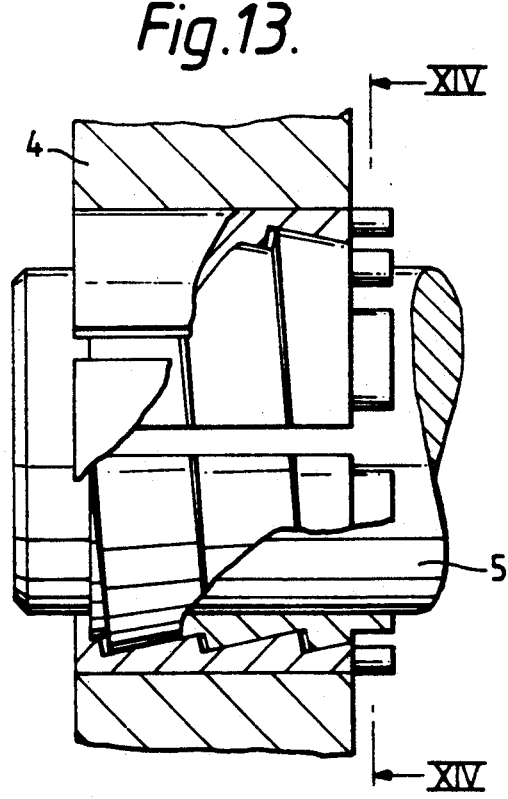
FIG. 13 illustrates the clamping sleeve mounted on the shaft of a wheel.
Figure 14:
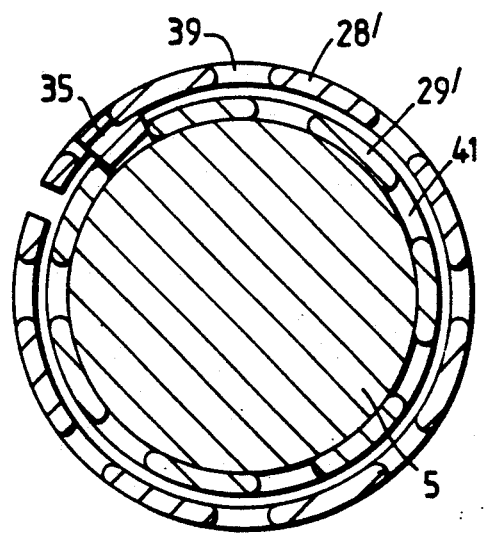
FIG. 14 is a sectional view alone line XIV—XIV of FIG. 13, FIGS. 15 and 16 show a securing tool in the shape of a lever engaged before, and after, respectively, mutually turning outer and inner sleeve 1/7 revolution.

FIGS. 12a and 12b, as mentioned, show the outer sleeve 28 and inner sleeve 29, whereas FIG. 13 shows an axle mounted in a wheel-hub 4, and FIG. 14 shows a cross section of the wrench mount portion with said axle 5 being surrounded.

Figure 15:
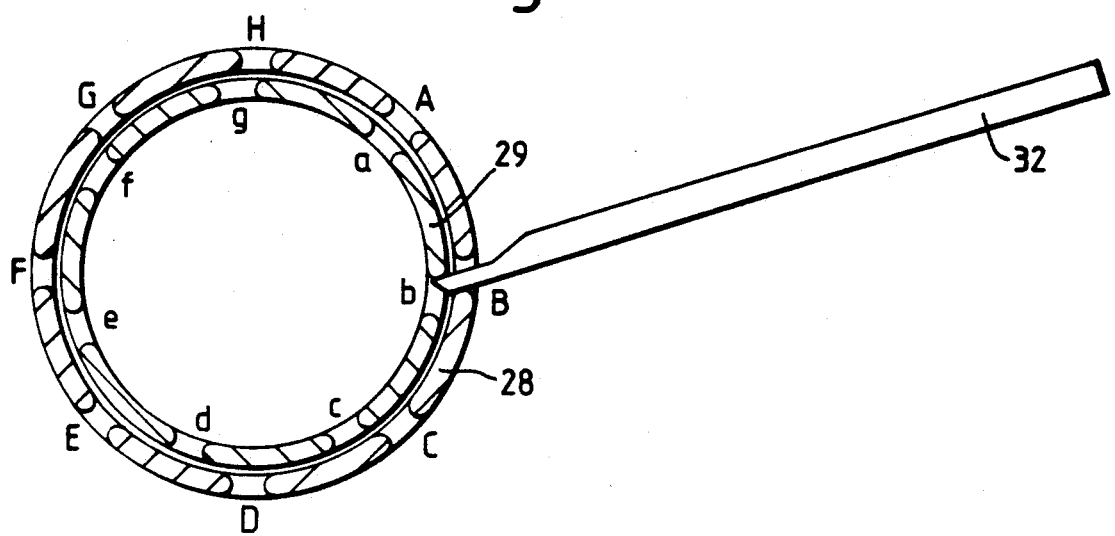
Figure 16:
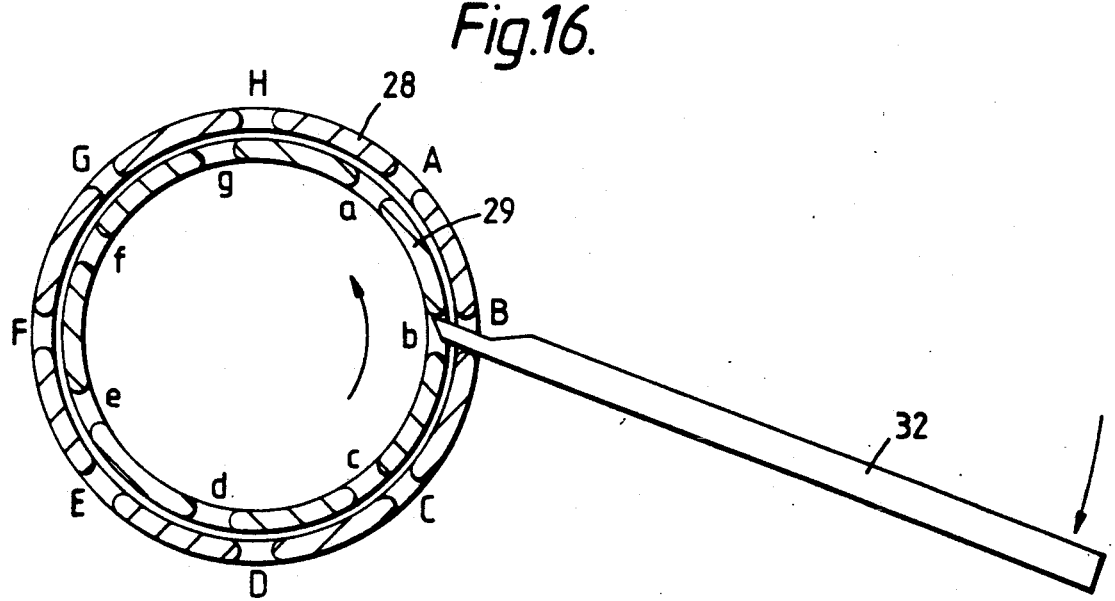
Figure 17:
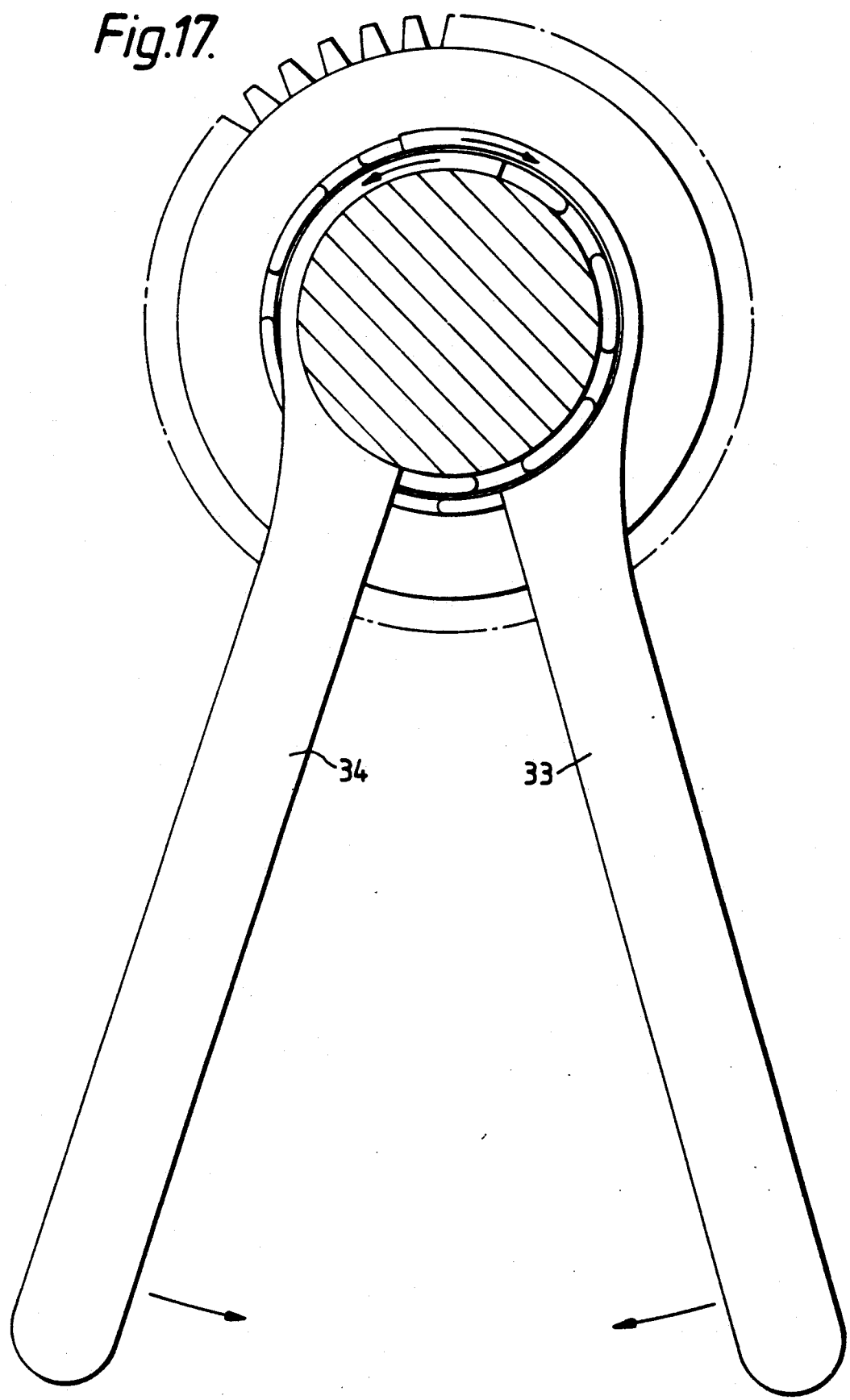
FIG. 17 illustrates an alternative securing mechanism utilizing two socket spanners.

FIGS. 15 and 16 show how the lever 32 is engaged with sleeves 28,29, before, and after one of the sleeves (29) is turned 1/7 of a revolution as compared to the other.

In order to mount wheels on shafts, sleeve 28 is at first pushed/screwed to stop on sleeve 29. Then the combined sleeve 28,29 is pushed into the hub 4 and shaft 5 is inserted into the sleeve/hub. After adjusting the wheel on its shaft the sleeve is tightened by the aid of the lever 32.

Operations for tightening sleeves by the aid of the lever 32 are as follows. In FIGS. 15 and 16 capital letters indicate the openings in outer sleeve 28, and small letters indicate the openings in inner sleeve 29. It will appear from FIG. 15 that openings A,a are aligned, whereas openings B,b are slightly displaced relative to each other. Position B/b will, thus, form a starting point for placing the lever 32. When lever 32 is manipulated, the position as shown in FIG. 16 will occur, with openings B, b aligned, whereas openings C,c form a new starting point for placing the bar. By carrying on in this manner until totally 7 lever operations are carried out, opening b will be aligned with opening A, and outer sleeve 28 is now rotated in relation to inner sleeve 29 corresponding to a sector a-b. These operations may continue until the desired torque is achieved by the aid of said tool. By providing lever 32 with a torque indicator it is possible to carry out a completely controlled tightening operation. In stead of utilizing a lever for tightening, socket spanners 33,34 may, alternatively, be used, as indicated in FIG. 17. If it is desired to lock the sleeves mutually in addition to the locking effect provided by friction, a locking pin 35, as shown in FIG. 14 may be mounted.

Figure 18:
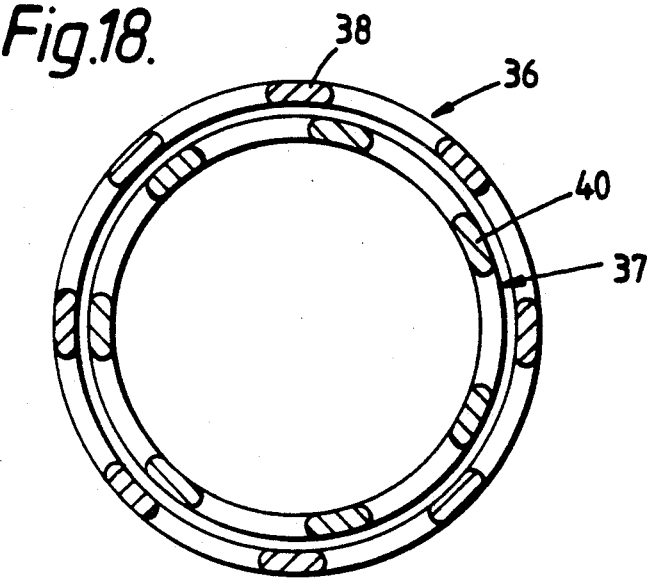
FIGS. 18 and 19 show a front elevation, and a perspective view, respectively, of a modified securing tool for tightening the clamping sleeve as shown in FIGS. 12-14, FIGS. 20 and 21 show a partly cut away side elevation, and a plan view, respectively, of a modification of the embodiment of FIGS. 18 and 19.

It might, however, be advantageous to use other kinds of securing tools, as illustrated in FIG. 18. In this case, two substantially coaxial and mutually rotatable spanner means are used including an outer socket spanner 36, having a wrench mount 36' and an inner socket spanner 37 having a wrench mount 37'. Outer wrench mount 36' is provided with a row of teeth 38 intended for engagement with slots 39 between teeth 28', as shown in FIGS. 12*a* and 14. In the same manner inner socket spanner 37 is provided with a row or a ring of teeth 40 intended to engage in slots 41 between teeth 29', cf. FIGS. 12*b* and 14.

By using common socket spanners or mechanized, hydraulic, electric, or pneumatic wrenches which can engage wrench mounts 36' and 37', powerful tightening of the clamping nut shown in FIGS. 12-14, may be achieved in a simple manner. It will be understood in this connection that by substituting conventional wrench mounts, as shown in some of the above described Figures, the securing tool shown in FIGS. 18 and 19 may readily be used for such devices. This fact is especially relevant in case it is suitable to operate a securing tool only from one side, as indicated in FIGS. 4 and 10, as well as in FIGS. 12-14.

It will also be understood from the above that the fixing device according to the present invention may be used for an umber of tasks, e.g. locking wheel-hubs and coupling halves onto shafts, connecting shafts, connecting pipes made of steel, other metals, plastic, etc. The sleeves according to the invention may be massive, but showing different strength as an alternative to be provided with the mentioned slots. By the aid of the non-threaded nut attachment fixing is achieved, in a most simple manner, due to the fact that both high axial and high radial force components are achieved. By using wrench mounts, as indicated in FIGS. 12-14, and in connection with fixing tools, as indicated in FIGS. 15-19, the torque exerted by the tool used will be evenly distributed, at the same time as the teeth on the inner and outer sleeves permit locking against unintentional rotation of one sleeve in relation to the other. If the number of teeth on the inner and outer sleeve differ, locking may be achieved with very slight adjustments of the tightening moment.

Figure 19:
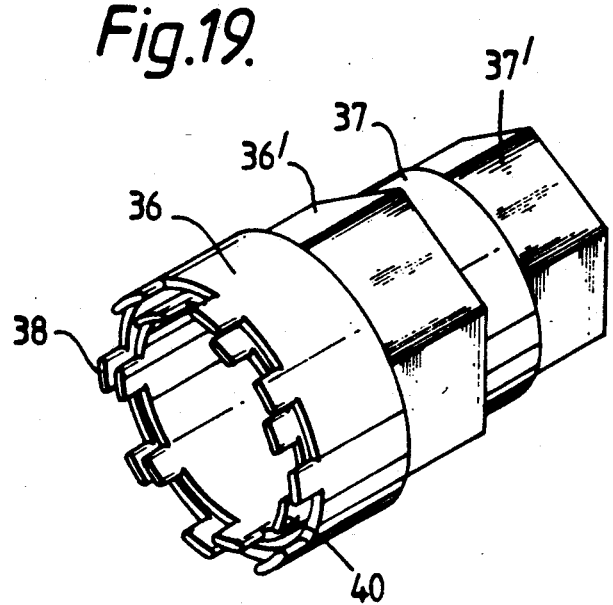

In FIGS. 20 and 21 a modification of the embodiment of FIGS. 18 and 19 is shown. Outer socket spanner 36" has a wrench mount 42 and inner socket spanner 37" has a wrench mount 43. Even though this is not to be considered as limiting the scope of the invention, wrench mounts 42 and 43 may have the same dimension. The performance is as disclosed in connection with FIGS. 18 and 19. Reference numeral 5 indicates a shaft, e.g. as shown in FIG. 14.

In FIG. 22 it is illustrated how heavy duty clamping sleeves can be released by introducing pressurized oil into grooves 42 on the threads of one or both of said sleeves, said grooves communicating with axially extending pressurized oil inlets in said at least one sleeve.

I claim:

1. A self-contained fastening device to be located between machine elements, comprising:
   one inner clamping sleeve member having an external cylindrical thread with a sawtooth profile of a first relatively small flank angle on one side and a substantially larger flank angle on the other side,
   an outer clamping sleeve member having an internal thread matching the external thread of the inner clamping sleeve member, one sleeve member coaxially encompassing the other, and
   a central clamping sleeve member having internal and external threads cooperating with the external thread of the inner clamping sleeve member and the internal thread of the outer clamping sleeve member, respectively, and being provided between the external thread of the inner clamping sleeve member and the internal thread of the outer clamping sleeve member,
   wherein said inner and outer clamping sleeve members through mutual rotation and prevention of mutual axial motion by stop means being provided as double stop means on said central clamping sleeve member, provide radial expansion of said outer sleeve member to exert a pressure against an outer machine element surrounding the outer clamping sleeve member and radial contraction of said inner sleeve member to exert pressure on an inner machine element surrounded by the inner clamping sleeve member and thereby radially two way and axial interlocking of said machine elements by frictional forces.

2. A device according to claim 1, wherein each of said inner and outer sleeve members has at least one axially extending through slot.

3. A device according to claim 2, further comprising:
   wrench mounts formed on the inner clamping sleeve member and outer clamping sleeve member, which are adjacent when said sleeve members are cooperating with said central clamping sleeve, and a wrench mount formed on said central clamping sleeve extending a distance from said inner and outer clamping sleeve wrench mounts approximately corresponding to the axial extent of threads of the respective inner and outer clamping sleeve members.

4. A self-contained fastening device to be located between machine elements, comprising:
   one inner clamping sleeve member having an external cylindrical thread with a sawtooth profile of a first relatively small flank angle on one side and a substantially larger flank angle on the other side,
   an outer clamping sleeve member having an internal thread matching the external thread of the inner clamping sleeve member, one sleeve member coaxially encompassing the other, and
   wrench mounts on the inner and outer clamping sleeve members including teeth with slots extending between said teeth,
   wherein said wrench mounts of said inner and outer clamping sleeve members are provided on the same side of the device, and
   wherein said inner and outer clamping sleeve members through mutual rotation and prevention of mutual axial motion by stop means provided on at least one of said inner sleeve member and said outer sleeve member, provide radial expansion of said outer sleeve member to exert a pressure against an outer machine element surrounding the outer clamping sleeve member and radial contraction of said inner sleeve member to exert pressure on an inner machine element surrounded by the inner clamping sleeve member and thereby radially two way and axial interlocking of said machine elements by frictional forces.

5. The device recited in claim 4, further comprising:
   a lock pin extending between one of the slots of the outer clamping sleeve member to prevent rotation of one of the clamping sleeve members relative to the other clamping sleeve member.

6. The device recited in claim 4,
   wherein at least one of said sleeve members is provided with a thread having a narrow groove communicating with axially extending pressurized oil inlets located in said at least one sleeve member.

7. A fastening device to be located between machine elements, comprising:

an outer clamping sleeve member with an internal cylindrical thread, and an inner clamping sleeve member with an external cylindrical thread having a sawtooth profile of a first relatively small flank angle on one side thereof and a second substantially larger flank angle on the other side thereof, the internal thread of the outer clamping sleeve member matching the external thread of the inner clamping sleeve member, said clamping sleeve members being mutually rotatable, wherein each of said inner and outer clamping sleeve members has at least one axially extending through slot in order to develop high radial, but low axial force components, when the clamping sleeve members are mutually tightened against stop means, thus providing radial expansion of said outer sleeve member to exert radial pressure against an outer machine element surrounding the outer clamping sleeve member and radial contraction of said inner sleeve member to exert pressure on an inner machine element surrounded by the inner clamping sleeve member and thereby radially two way and axial interlocking of said machine elements by frictional forces, and wherein said clamping sleeve members include wrench mounts, and a central clamping sleeve with internal and external threads cooperating respectively with the external thread of the inner clamping sleeve member and the internal thread of the outer clamping sleeve member, said stop means being provided as double stop means on said central clamping sleeve member.

8. A fastening device to be located between machine elements, comprising:

an outer clamping sleeve member with an internal cyulindrical thread, and an inner clamping sleeve member with an external cylindrical thread having a sawtooth profile of a first relatively small flank angle on one side thereof and a second substantially larger flank angle on the other side thereof, the internal thread of the outer clamping sleeve member matching the external thread of the inner clamping sleeve member, said clamping sleeve members being mutually rotatable, and one of said members has stop means formed thereon, wherein said clamping sleeve members include wrench mounts with teeth and slots extending between said teeth, wherein said wrench mounts of said clamping sleeve members are provided on the same side of the device, and wherein each clamping sleeve member has at least one axially extending through slot in order to develop high radial, but low axial force components, when the clamping sleeve members are mutually tightened against said stop means, thus providing radial expansion of said outer sleeve member to exert radial pressure against an outer machine element surrounding the outer clamping sleeve member and radial contraction of said inner sleeve member to exert pressure on an inner machine element surrounded by the inner clamping sleeve member and thereby radially two way and axial interlocking of said machine elements by frictional forces.

9. A fastening device acting as a nut on a threadless shaft, comprising:

one inner clamping sleeve member having an external conical thread with a sawtooth profile of a first relatively small flank angle on one side thereof and a second substantially larger flank angle on the other side thereof, and an outer clamping sleeve member having an internal thread matching the external thread of the inner clamping sleeve member, one sleeve member coaxially encompassing the other, and wherein said inner clamping sleeve member is provided with an axially extending through slot in order to develop a high radial force component against the shaft, and said outer clamping sleeve member imposes an axial movement relative to the inner clamping sleeve member, and an axial force to another element coaxial to said shaft, when said clamping sleeve members are mutually tightened and said outer clamping sleeve member overhangs said inner clamping sleeve member in the direction of axial movement of said outer clamping sleeve member.

10. A device according to claim 9, wherein said inner sleeve member has corrugations on its inner face.

11. A self-contained fastening device to be located between machine elements, comprising:

one inner clamping sleeve member having an external cylindrical thread with a sawtooth profile of a first relatively small flank angle on one side and a substantially larger flank angle on the other side, and an outer clamping sleeve member having an internal thread matching the external thread of the inner clamping sleeve member, one sleeve member coaxially encompassing the other, wherein said inner and outer clamping sleeve members through mutual rotation and prevention of mutual axial motion by a stop means formed on one of said sleeve members, provide radial expansion of said outer sleeve member to exert a pressure against an outer machine element surrounding the outer clamping sleeve member and radial contraction of said inner sleeve member to exert pressure on an inner machine element surrounded by the inner clamping sleeve member and thereby radially two way and axial interlocking of said machine elements by frictional forces, and wherein, in order to mutually interlock said sleeve members, wrench mounts are provided on the inner and outer clamping sleeve members including teeth with slots extending between said teeth, the number of teeth being different on said two sleeve members to offer a variety of locking opportunities as the sleeves are mutually rotated, and a lock pin being installable in adjacent slots on said sleeve members.

12. A fastening device to be located between machine elements, comprising:

an outer clamping sleeve member surrounded by an outer machine element and an inner clamping sleeve member surrounding an inner machine element, one sleeve member coaxially encompassing the other, wherein mutual rotation expands the outer sleeve member to exert a radial pressure against the outer machine element and contracts the inner sleeve member to exert a radial pressure on the inner machine element, thereby interlocking said machine elements by frictional forces, wherein the inner sleeve member has an external cylindrical thread with a sawtooth profile of a first, relatively small flank angle on one side thereof and a second, substantially larger flank angle on the other side thereof, the internal thread of the outer clamping sleeve member matching the external thread of the inner clamping sleeve member, said clamping sleeve members being mutually rotatable, wherein through mutual tightening against s top means high radial, but low axial force components are created, and a central clamping sleeve having internal and external threads cooperating with the external thread of the inner clamping sleeve member and the internal thread of the outer clamping sleeve member, respectively, and being provided between the external thread of the inner clamping sleeve member and the internal thread of the outer clamping sleeve member, said stop means being provided as double stop means on said central clamping sleeve member.

13. A device according to claim 12, further comprising:

wrench mounts formed on the inner clamping sleeve member and outer clamping sleeve member, in the form of teeth with slots extending between the teeth, which are adjacent when said sleeve members are cooperating.

14. A device according to claim 12, wherein each of said inner and outer sleeve members has at least one axially extending through slot.

15. A device according to claim 14, further comprising:

wrench mounts formed on the inner clamping sleeve member and outer clamping sleeve member, which are adjacent when said sleeve members are cooperating with said central clamping sleeve, and a wrench mount formed on said central clamping sleeve extending a distance from said inner and outer clamping sleeve wrench mounts approximately corresponding to the axial extent of threads of the respective inner and outer clamping sleeve members.

16. A fastening device to be located between machine elements, comprising:

an outer clamping sleeve member surrounded by an outer machine element and an inner clamping sleeve member surrounding an inner machine element, one sleeve member coaxially encompassing the other, wherein mutual rotation expands the outer sleeve member to exert a radial pressure against the outer machine element and contracts the inner sleeve member to exert a radial pressure on the inner machine element, thereby interlocking said machine elements by frictional forces, and wrench mounts on the inner and outer clamping sleeve members including teeth with slots extending between said teeth, wherein the inner sleeve member has an external cylindrical thread with a sawtooth profile of a first, relatively small flank angle on one side thereof and a second substantially cylindrical thread matching the external thread of the inner sleeve member, wherein the outer clamping sleeve member has an internal thread matching the external thread of the inner clamping sleeve member, wherein one of said members has stop means thereon, wherein, through mutual tightening against said stop means, high radial, but low axial force components are created, and wherein said wrench mounts of said inner and outer clamping sleeve members are provided on the same side of the device.

17. A fastening device to be located between machine elements, comprising:

an outer clamping sleeve member with an internal thread surrounded by an outer machine element, and an inner clamping sleeve member with an external thread surrounding an inner machine element, said clamping sleeve members being mutually rotatable to create expansion of the outer sleeve member, thereby exerting radial pressure against said outer machine element and contraction of said inner sleeve member, thereby exerting radial pressure on the inner machine element which connects said elements by frictional forces, wherein each of said inner and outer clamping sleeve members has at least one axially extending through slot in order to develop high radial, but low axial force components when the clamping sleeve members are mutually tightened against said stop means, and wherein said clamping sleeve members include wrench mounts, and a central clamping sleeve with internal and external threads cooperating respectively with the external thread of the inner clamping sleeve member and the internal thread of the outer clamping sleeve member, said stop means being provided as double stop means on said central clamping sleeve member.

18. A self-contained fastening device acting as a threadless nut on a smooth shaft of circular cross section to axially fix a machine element on said shaft, comprising:

a single piece, integral inner clamping sleeve member having an external conical thread with a sawtooth profile of a relatively small flank angle on one side and a substantially larger flank angle on the other side, and a single piece integral outer clamping sleeve member having an internal thread matching the external thread on the inner clamping sleeve member, one sleeve member coaxially encompassing the other, wherein only said inner sleeve member has a longitudinally extending through slot, and wherein said inner and outer clamping sleeve members are mutually rotatable and adapted to provide, through mutual rotation thereof, radial contraction of said inner sleeve member to exert pressure on said shaft surrounded by said inner clamping sleeve member to fix said inner clamping sleeve member on said shaft by frictional force and thereby axially fix and exert an axial force on said shaft, said outer clamping sleeve member imposing an axial movement, relative to said inner clamping sleeve member, and an axial force to said machine element, and said outer clamping sleeve member overhanging said inner clamping sleeve member in the direction of axial movement of said outer sleeve.

19. A fastening device according to claim 18, wherein, in order to mutually interlock said sleeve members, wrench mounts are formed on the inner clamping sleeve member and outer clamping sleeve member, said wrench mounts being adjacent to each other when said sleeve members are coaxially encompassing each other.

20. A self-contained fastening device acting as a threadless nut on a smooth shaft of circular cross section to axially fix a machine element on said shaft, comprising:
- one inner clamping sleeve member having an external cylindrical thread with a sawtooth profile of a relatively small flank angle on one side and a substantially larger flank angle on the other side, and an outer clamping sleeve member having an internal thread matching the external thread on the inner clamping sleeve member, one sleeve member coaxially encompassing the other,
- wherein the profile of the threaded part of said inner clamping sleeve member tapers towards a correspondingly tapered profile of the threaded part of said outer clamping sleeve member,
- wherein only said inner sleeve member has a longitudinally extending through slot and said outer sleeve is of a mechanically strong material,
- and wherein said inner and outer clamping sleeve members are mutually rotatable and adapted to provide, through mutual rotation thereof, radial contraction of said inner sleeve member to exert pressure on said shaft surrounded by said inner clamping sleeve member to fix it on said shaft by frictional force and thereby axially fix and exert an axial force on said shaft, said machine element being adjacent said fastening device,
- wherein, in order to mutually interlock said sleeve members, wrench mounts are formed on the inner clamping sleeve member and outer clamping sleeve member, said wrench mounts being adjacent to each other when said sleeve members are coaxially encompassing each other, and
- wherein said wrench mounts include teeth with slots extending between the teeth, the number of teeth being different on said two sleeve members to offer a variety of locking opportunities as the sleeves are mutually rotated.

21. A fastening device according to claim 20, further comprising:
- a lock pin extending between a slot of the outer clamping sleeve member and a slot of the inner clamping sleeve member to prevent rotation of one of the clamping sleeve members relative to the other clamping sleeve member.

* * * * *

UNITED STATES PATENT AND TRADEMARK OFFICE
CERTIFICATE OF CORRECTION

PATENT NO. : 5,232,249
DATED : August 3, 1993
INVENTOR(S) : HARALD KOLVEREID

It is certified that error appears in the above-identified patent and that said Letters Patent is hereby corrected as shown below:

Col. 6, line 8, "31, 31" should be --30, 31--;

line 8, "38' and 29;" should be --28' and 29;--.

Col. 7, line 49, "42" should be --44--.

Col. 8, line 61, "member to prevent rotation" should be --member and one of the slots of the inner clamping sleeve member to prevent rotation--.

Col. 9, line 39, "cyulindrical" should be --cylindrical--.

Col. 11, line 9, "s top" should be --stop--.

Col. 12, line 64, :18" should be --9--.

Signed and Sealed this

Twenty-eight Day of March, 1995

Attest:

BRUCE LEHMAN

Attesting Officer    Commissioner of Patents and Trademarks